United States Patent
Turner et al.

(10) Patent No.: US 7,953,424 B2
(45) Date of Patent: May 31, 2011

(54) APPARATUS AND METHOD FOR IMPROVING PAGING PERFORMANCE WHILE SIMULTANEOUSLY OPERATING IN DIFFERENT TYPES OF COMMUNICATION NETWORKS

(75) Inventors: Simon Turner, San Diego, CA (US); Abhay Arvind Joshi, San Diego, CA (US); Arthur James Neufeld, Longmont, CO (US); Serguei A. Glazko, San Diego, CA (US); Steven C. Ciccarelli, Ramona, CA (US); Gregory Robert Lie, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 864 days.

(21) Appl. No.: 11/357,667

(22) Filed: Feb. 17, 2006

(65) Prior Publication Data

US 2006/0189346 A1    Aug. 24, 2006

Related U.S. Application Data

(60) Provisional application No. 60/656,282, filed on Feb. 24, 2005, provisional application No. 60/655,626, filed on Feb. 22, 2005.

(51) Int. Cl.
*H04W 68/00* (2009.01)
*H04W 4/00* (2009.01)
(52) U.S. Cl. .................. 455/458; 455/439; 455/436
(58) Field of Classification Search .......... 455/458, 455/556–557, 422.1, 561; 370/338, 359, 370/397
See application file for complete search history.

(56) References Cited

U.S. PATENT DOCUMENTS

| | | | |
|---|---|---|---|
| 5,103,459 A * | 4/1992 | Gilhousen et al. | 370/206 |
| 5,830,064 A * | 11/1998 | Bradish et al. | 463/22 |
| 6,738,373 B2 | 5/2004 | Turner | |
| 7,359,347 B2 * | 4/2008 | Ahmavaara et al. | 370/328 |
| 2003/0017833 A1 * | 1/2003 | Forrester | 455/456 |
| 2003/0152044 A1 * | 8/2003 | Turner | 370/328 |
| 2004/0037222 A1 * | 2/2004 | Kim et al. | 370/229 |
| 2004/0179495 A1 * | 9/2004 | Ramakrishnan et al. | 370/334 |
| 2005/0227631 A1 * | 10/2005 | Robinett | 455/83 |
| 2006/0111115 A1 * | 5/2006 | Marin et al. | 455/442 |

\* cited by examiner

*Primary Examiner* — Charles N Appiah
*Assistant Examiner* — Emem Stephen
(74) *Attorney, Agent, or Firm* — Kenneth K. Vu; Abodollah Katbab

(57) ABSTRACT

A system and method of improving wireless communications between a wireless communication device and both a first network supporting voice and data services and a second network supporting packet data services. The method comprises providing the WCD with a primary transceiver and a secondary receiver for conducting wireless communications in both a simultaneous-mode and a hybrid-mode; performing simultaneous-mode-to-hybrid-mode and hybrid-mode-to-simultaneous-mode transitions based on a performance metric; and evaluating the performance metric to determine whether to perform the mode transitions. In the simultaneous-mode, the primary transceiver conducts wireless communications in the second network and the secondary receiver conducts wireless communications in the first network. In the hybrid-mode, the primary transceiver use is time multiplexed during all of the first and second networks communications combinations. When the metric measures below a threshold, the WCD reverts from one mode to another mode at paging slot wake-ups.

27 Claims, 5 Drawing Sheets

APPARATUS AND METHOD FOR IMPROVING PAGING PERFORMANCE WHILE SIMULTANEOUSLY OPERATING IN DIFFERENT TYPES OF COMMUNICATION NETWORKS

CLAIM OF PRIORITY UNDER 35 U.S.C. §119

The present Application for Patent claims priority to Provisional Application No. 60/656,282, entitled "Method for Improving IS-2000 Paging Performance During IS-856 Traffic for ATs which Support Simultaneous IS-2000 Paging and IS-856 Traffic Operation," filed Feb. 24, 2005, which is expressly incorporated herein by reference.

Reference To Co-Pending Applications For Patent

The present Application for Patent is related to the following co-pending U.S. patent application: "Apparatus and Method for Allowing Page Monitoring of a Communication System during Traffic/Broadcast Channel Operation without Reducing Traffic Performance" by Abhay Joshi et al., having U.S. Provisional Patent Application No. 60/655,626, filed Feb. 22, 2005, and assigned to the assignee hereof, which is expressly incorporated herein by reference.

BACKGROUND

1. Field

The present invention generally relates to wireless communications and, in particular, to wireless communication systems and methods for improving paging performance while operating in different types of communication networks.

2. Background

As mobile communication systems become more prevalent in society, the demands for greater and more sophisticated services have grown. To meet the capacity needs of mobile communication systems, techniques for multi-user access to a limited communication resource have been developed. The use of Code Division Multiple Access (CDMA) modulation techniques is one of several techniques for facilitating communications in which a large number of system users are present. Other multiple access communication system techniques, such as Time Division Multiple Access (TDMA) and Frequency Division Multiple Access (FDMA) are known in the art. However, the spread spectrum modulation technique of CDMA has significant advantages over these modulation techniques for multiple access communication systems.

Presently, there are many different types of communication networks offering services to users. Some types of communication networks are optimized for providing both voice and relatively slow data-rate data services to a user. Such communication networks include networks operating in accordance with IS-2000 or the Global System for Mobile (GSM) Communications standards, for example. On the other hand, other types of communication networks are optimized for providing efficient, relatively high-speed packet data services to the user. Such communication networks include High Data Rate (HDR) networks operating in accordance with the IS-856 communication standard, for example.

The user typically accesses voice and/or data services associated with the different types of communication networks using a mobile terminal (referred to herein as a Wireless Communication Device (WCD)). However, conventional WCDs are typically capable of operating over only one type of communication network, such as with an IS-2000 network system, or alternatively, with an IS-856 network system. Therefore, such conventional WCDs do not individually provide optimized communication services to the user through both types of communication networks. As a result, the user may need to use multiple, different WCDs should the user wish to utilize the optimized services available on the different networks. Stated another way, there has been a need for a WCD capable of operating over the above-mentioned different types of networks. Therefore, the Applicant has provided a user of the WCD with optimized voice and data services over multiple types of networks with an invention that is capable of establishing data sessions on both a first network (such as an IS-2000 network) supporting voice and data services, and a second network (such as an IS-856 network) supporting packet data services. The invention for the above is disclosed in U.S. Pat. No. 6,738,373 to Turner, entitled "Wireless Communication Device Operable on Different Types of Communication Networks," issued May 18, 2004, which is assigned to the assignee of the present application. In the co-pending application "Apparatus and Method for Allowing Page Monitoring of a Communication System during Traffic/Broadcast Channel Operation without Reducing Traffic Performance," U.S. Provisional Application No. 60/655,626, Applicant discloses a system and method for page monitoring of a communication system during 1xEVDO traffic without reducing 1xEV-DO traffic performance. There is still a further need in the art, however, for an apparatus and method for improving IS-2000 paging performance during IS-856 traffic for Access Terminals (ATs) that support simultaneous IS-2000 paging and IS-856 traffic operation.

SUMMARY

The invention relates to a system and method of improving wireless communications between a wireless communication device and both a first network supporting voice and data services and a second network supporting packet data services. The method comprises providing the WCD with a primary transceiver and a secondary receiver for conducting wireless communications in both a simultaneous-mode and a hybrid-mode; performing simultaneous-mode-to-hybrid-mode and hybrid-mode-to-simultaneous-mode transitions based on a performance metric; and evaluating the performance metric to determine whether to perform the mode transitions. In the simultaneous-mode, the primary transceiver conducts wireless communications in the second network and the secondary receiver conducts wireless communications in the first network. In the hybrid-mode, the primary transceiver use is time multiplexed during all of the first and second networks communications combinations. The performance metric may be the total received power ($I_o$) detected on the receiver, and when the metric measures below a threshold, the WCD reverts from one mode to another mode at paging slot wake-ups. With this aspect, the first network may be an IS-2000 network and the second network may be an IS-856 network. The hysteresis may be maintained by setting the hybrid-to-simultaneous threshold to be higher than the simultaneous-to-hybrid threshold and, in particular, the ping-pong effect may be prevented by setting the difference between the two thresholds to be greater than the difference between the primary antenna gain and the secondary antenna gain.

In another aspect, the WCD may dynamically invoke Simultaneous-mode to optimize High Priority Traffic (HPT) latency/throughput without sacrificing 1x paging performance. More specifically, this aspect relates to a system and method of conducting wireless communications between a WCD and both a first network supporting voice and data services and a second network supporting packet data services. The method comprises providing the WCD with a primary transceiver and a secondary receiver for conducting wireless communications in both a simultaneous-mode and a hybrid-mode, wherein the second network applications have low latency data services and are able to invoke the High Priority Traffic (HPT) mode in the WCD to operate in the Simultaneous-mode. Similarly to the first aspect, the first network may be an IS-2000 network and the second network may be an IS-856 network. With this aspect, the WCD may use the secondary receiver for spatial diversity for the second network while no first network activities are performed, but unlike the first aspect, this process does not perform hybrid-mode-to-simultaneous-mode transitions based on a performance metric.

DETAILED DESCRIPTION

Figure 1:
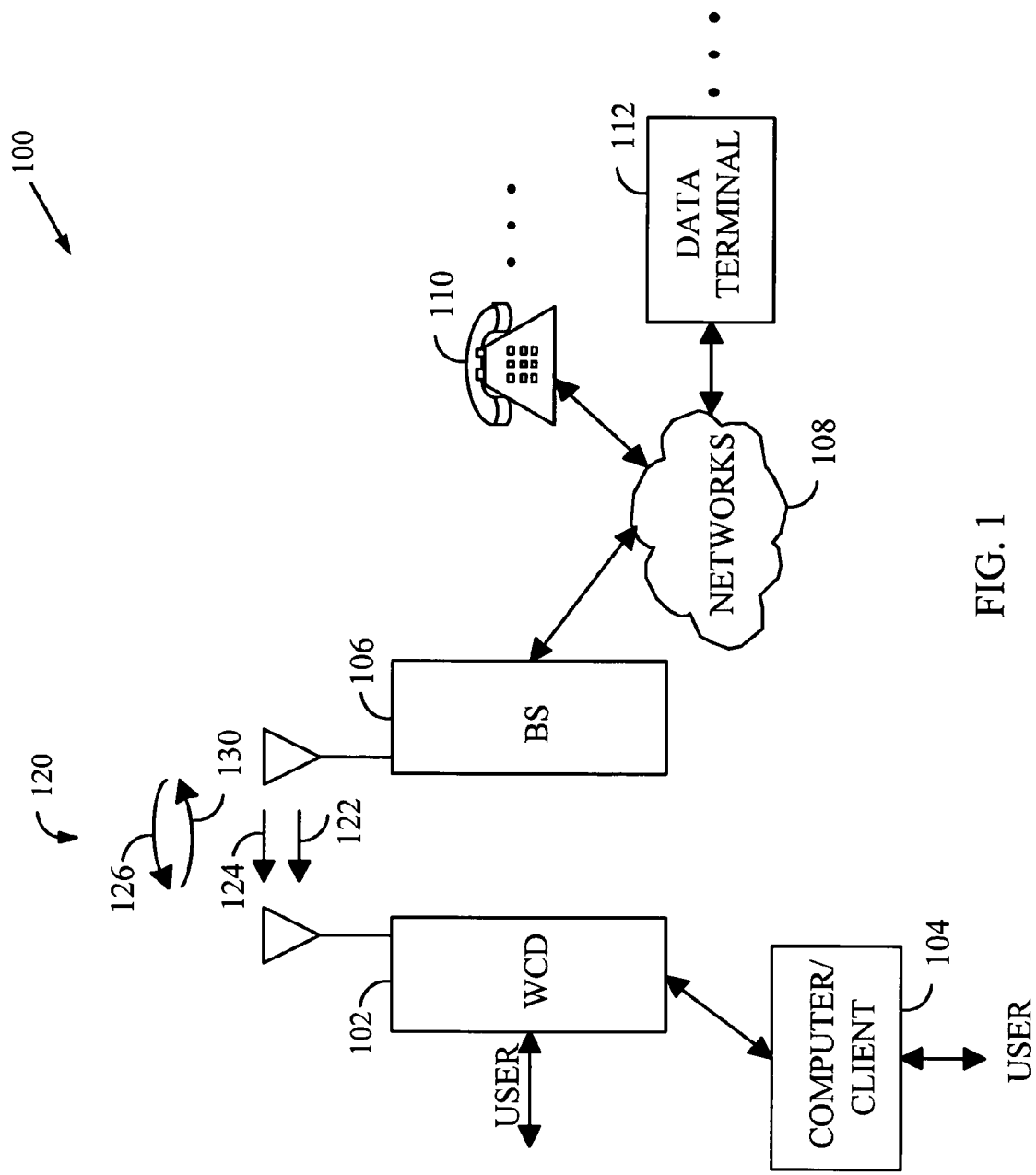
FIG. 1 is a diagram of a network environment in which a Wireless Communication Device (WCD) may operate.

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an Access Terminal (AT), may be mobile or stationary, and may communicate with one or more HDR base stations, referred to herein as Modem Pool Transceivers (MPTs). An AT transmits and receives data packets through one or more MPT to an HDR base station controller, referred to herein as a Modem Pool Controller (MPC). MPTs and MPCs are parts of a network called an AN. An AN transports data packets between multiple access terminals. The AN may be further connected to additional networks outside the AN, such as a corporate intranet or the Internet, and may transport data packets between each AT and such outside networks. An AT that has established an active traffic channel connection with one or more MPTs is called an active AT, and is said to be in a traffic state. An AT that is in the process of establishing an active traffic channel connection with one or more MPTs is said to be in a connection setup state. An AT may be any data device that communicates through a wireless channel or through a wired channel, for example, using fiber optic or coaxial cables. An AT may further be any of a number of types of devices, including but not limited, a to PC card, a compact flash, an external or internal modem, or a wireless or wireline phone. The communication link through which the AT sends signals to the MPT is called a reverse link. The communication link through which a MPT sends signals to an AT is called a forward link.

Different standards employed by packet data and voice networks pose a problem for dual mode or hybrid ATs. For example, the packet data network may employ a different communication protocol from the voice network. In some cases, the different communication protocols used by the different radio networks prevent sharing information between radio networks or interworking to facilitate dual mode operation. Thus, the AT must maintain communications with two incompatible radio networks. That is, the AT must comply with the communication protocols of both radio networks.

Currently, there exists hybrid ATs that are capable of dual mode operation in an IS-856 network and an IS-2000 network. In the IS-856 network, these access terminals are expected to transmit continuously on a Reverse Traffic Channel (RTC), monitor a forward control channel, and demodulate a Reverse Link Power Control (RPC) channel, while their connection to the radio network is open as further described below. At the same time, these ATs must be able to receive page requests that are sent from a plurality of Mobile Switching Centers (MSCs) via the IS-2000 radio network while maintaining their connection with the IS-856 radio network. Such page requests may be intended for voice call delivery or Short Message Service (SMS) delivery, or delivery of other services. These ATs must also be able to perform certain procedures required by the IS-2000 radio network, such as idle hand-off procedure, registration procedures, as well as many other idle state procedures.

Referring to FIG. 1, there is shown a block diagram of an example network environment 100 in which a hybrid AT may operate. Hybrid AT 102 is a WCD capable of operating with different types of communication networks. Hybrid AT 102 (also referred to as WCD 102) may communicate with a first network operating in accordance with a first set of communication standards; and in addition, WCD 102 may communicate with a second network operating in accordance with a second, different set of communication standards. In an exemplary configuration of WCD 102, the WCD 102 may provide voice, data, and data messaging services to a user of the WCD 102 over networks operating in accordance with IS-2000 standards. Moreover, WCD 102 may provide packet data services to a user of the WCD 102 over networks operating in accordance with IS-856 standards. For illustrative purposes, the present invention is described in the context of WCD 102 operating on IS-2000 and IS-856 networks. However, it is to be understood that the present invention is not limited to such illustrative networks. Other configurations of WCD 102 may connect to and operate on other combinations of networks, including networks operating in accordance with GSM standards, for example.

WCD 102 may operate on each of the above-mentioned first and second different types of networks and may also be capable of handing-off data calls between the first and second network in the manner described below. These capabilities of WCD 102 enable a single AT, i.e., WCD 102 is able to provide voice, data and short messaging services on the first network, and is also able to provide efficient, high-speed packet data services on the second network.

Referring back to FIG. 1, example network environment 100 includes a computer/client 104 coupled to WCD 102. The user may access data services through computer/client 104. System 100 also includes a base station 106 coupled to multiple networks 108. Base station 106 operates in accordance with either or both the first communication standards (for example, IS-2000) and/or the second communication standards (for example, IS-856). Networks 108 may include the Public Switched Telephone Network (PSTN), multiple Packet Switched Data Networks, the Internet, and so on. One or more of networks 108 operate in accordance with the first communication standards, and one or more of the networks operate in accordance with the second communication standards. Voice terminals 110 and data terminals 112, such as computer/servers, may be connected to base station 106 through networks 108.

With regard to data services, base station 106 is coupled to one or more Packet Data Serving Nodes (PDSNs) included in networks 108. A PDSN routes data packets received from base station 106 to an appropriate data network in data networks 108, and thus, to a destination device (such as data terminal 112). Additionally, the PDSN routes data packets from a network source (such as data terminal 112), and destined for WCD 102, to base station 106.

WCD 102 inter-operates with base station 106, and thus with networks 108 and terminals 110 and 112, over an air interface 120 between WCD 102 and base station 106. Air interface 120 operates in accordance with the first and/or second communication standard depending on whether base station 106 is part of the first and/or second network. In an exemplary configuration, air interface 120 includes a pilot channel 122 transmitted by base station 106, a paging channel 124 transmitted by base station 106, a forward-link traffic channel 126 transmitted by base station 106, and a reverse-link traffic channel 130 transmitted by WCD 102.

Figure 2:
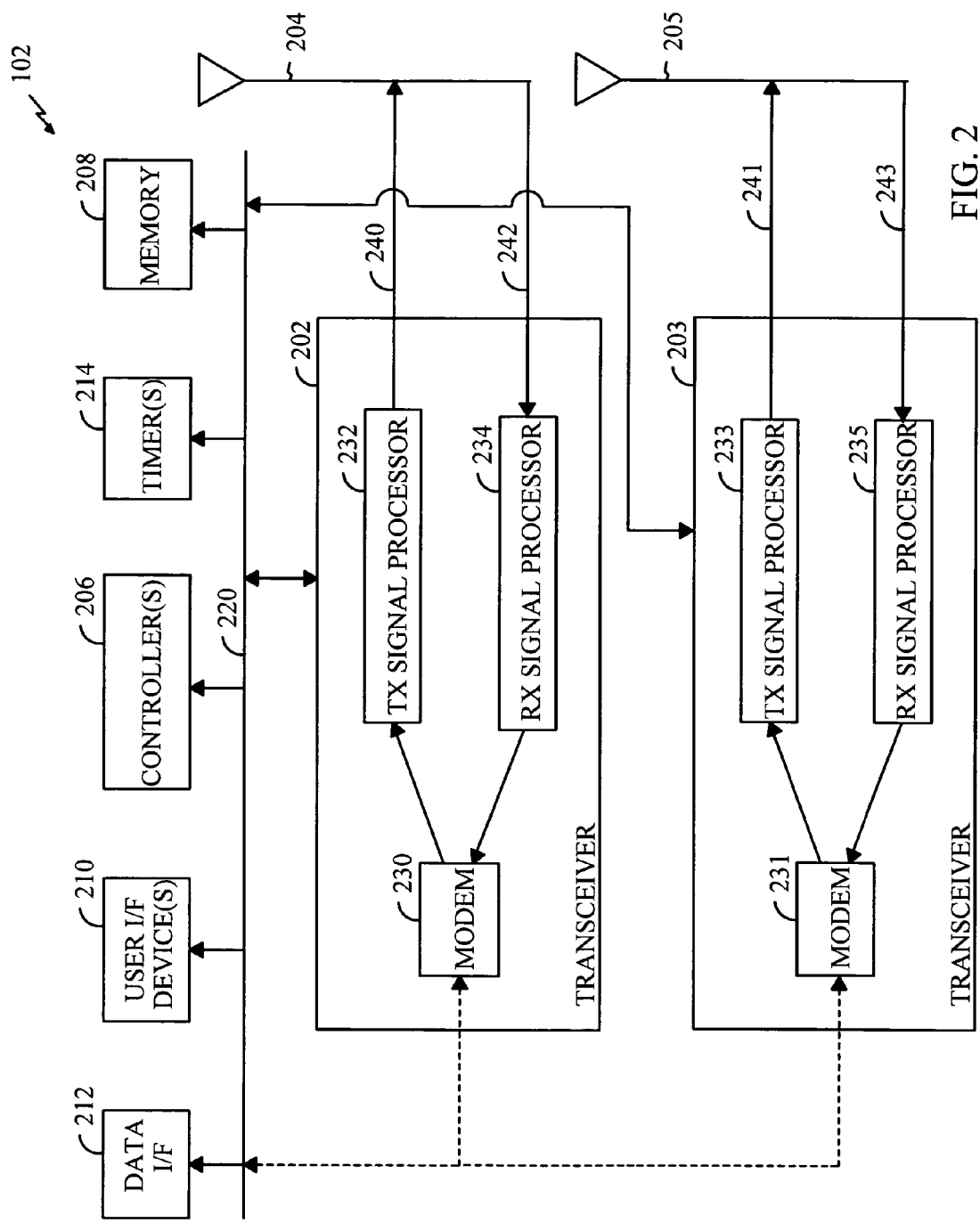
FIG. 2 is a block diagram of the WCD of FIG. 1.

FIG. 2 is a block diagram of WCD 102, which includes a first transmitter-receiver (transceiver) section 202 coupled to a primary antenna 204 and a second receiver section 203 coupled to a secondary antenna 205. It should be noted that receiver section 203 could be a transmitter-receiver (transceiver) section as illustrated in FIG. 2. WCD 102 also includes a controller (or a plurality of controllers) 206, a memory 208, user interface devices 210, a data interface 212, and one or more timer(s) 214, all coupled to one another, and to first transceiver 202 and second receiver 203, over a common data bus 220. The above-mentioned functions/elements of WCD 102 may exchange information/data with one another over data bus 220. Timer(s) 214 include a Dual-Dormancy Timer for establishing a Dormancy time-out period as described in U.S. Pat. No. 6,738,373. Timer(s) 214 may be part of controller 206, which may be implemented in hardware, software or a combination thereof. Controller 206 may program timer(s) 214, start and stop the timer(s) 214, and may be responsive to an expiration of the timer(s) 214.

Data interface 212 receives data from and transmits data to a computer (such as computer 104) coupled to the data interface 212. User interface devices 210 may include voice interface devices such as a speaker and a microphone, a keypad for entering information into WCD 102 and a display for displaying information to a user of device 102. Controller 206 controls the overall operation of WCD 102, and executes computer programs stored in memory 208. Memory 208 stores the computer programs along with information necessary for the operation of WCD 102.

Transceiver 202 includes a modem 230 coupled with a transmit signal processor 232 for processing voice and data based signals from primary antenna 204. Receiver 203 includes a modem 231 coupled with a receive signal processor 235 for processing voice and data based signals from secondary antenna 205. In another aspect, transceiver 203 may include a modem 231 coupled with a transmit signal processor 233 for processing voice and data based signals from secondary antenna 205. Modems 230, 231 include analog and/or digital modulators and demodulators functions for modulating and demodulating voice and data based signals in accordance with the communication standards associated with the first and second networks as mentioned above. More specifically, modems 230, 231 provide voice and/or data signal formatting, encoding, interleaving, modulating functions, decoding, de-interleaving, and demodulating functions.

Transmit signal processor 232 include digital and/or analog signal processing components for frequency-up converting modulated data from modem 230. In particular, transmit signal processor 232 provides transmit signal 240 to primary antenna 204. Primary and secondary antennas 204, 205 provide received signals 242, 243 to receive signal processors 234, 235, respectively. Receive signal processors 234, 235 frequency down-convert received signals 242, 243 and provide the down-converted received signals 242, 243 to modems 230, 231, respectively. The primary and secondary antennas 204, 205 transmit signals to and receive signals from base station 106 over air interface 120 as illustrated in FIG. 1.

A feature of the WCD 102 is that it provides an increased realizable throughput and decreased latency over IS-856 radio networks functioning in Hybrid-mode operation with IS-2000 networks. In particular, the WCD 102 provides simultaneous 1xEV-DO traffic and 1x paging feature.

A 1xEV-DO hybrid AT is capable of operating on both IS-2000 and IS-856 radio networks. For the terminal to function on both networks with only one antenna/transceiver pair, operation is time multiplexed in a co-operative fashion referred to as Hybrid-mode. While Hybrid-mode is designed to sacrifice as little as possible in IS-2000 and IS-856 performance, the IS-856 best-case throughput and worst-case latency incur a penalty, and the IS-856 broadcast service may be interrupted due to the time multiplexed use of the radio interface.

The most common IS-2000 operation, which affects the IS-856 performance, is idle slotted mode operation. To ensure that the IS-2000 modem does not miss incoming pages during IS-856 traffic, the IS-856 modem periodically suspends the IS-856 traffic connection and allows the IS-2000 modem to decode the paging channel. This causes periods where no data between the AT and the AN may be transferred in either direction.

With the present WCD 102, there is provided a Simultaneous-mode of operation that is designed to reduce the IS-2000 slotted mode's effect on the IS-856 traffic and broadcast service. In the Simultaneous-mode, a secondary receiver is provided as illustrated in FIG. 2 that is used for the IS-2000 slotted mode operation while the IS-856 traffic continues on the primary transceiver simultaneously. It should be noted that the Simultaneous-mode does not benefit the IS-2000 modem performance. However, the Simultaneous-mode is intended to provide benefit to the IS-856 while not adversely affecting the IS-2000 performance.

Simultaneous-Mode Usage

The Simultaneous-mode may be invoked during the following scenarios:

(1) IS-856 access with IS-2000 slotted paging;
(2) IS-856 traffic with IS-2000 slotted paging; and
(3) IS-856 broadcast with IS-2000 slotted paging.

All other IS-2000 and IS-856 mode combinations use traditional Hybrid-mode, which permits only one air interface at a time to use the radio, e.g., when the IS-2000 modem loses service during the IS-856 traffic, the IS-2000 system has to reacquisition functions in the Hybrid-mode and, as a result, periodically interrupts the IS-856 traffic.

The following summarizes the typical reasons the Simultaneous-mode may be interrupted while the IS-856 modem is in a traffic, access or broadcast connection:

(1) The IS-2000 modem may need to scan for a more preferred system within the current geographical region;
(2) The IS-2000 modem may lose service and reenter system acquisition;

(3) The IS-2000 modem may determine that the RF conditions warrant the more sensitive primary receiver so that IS-2000 paging performance is not adversely affected;

(4) The IS-2000 modem may need to register when in timer-based or zone-based registration modes; and (5) The IS-2000 modem may originate a call or respond to a page.

In addition, the IS-856 nontraffic-related operations are always performed in the Hybrid-mode regardless of the state of the IS-2000 modem. Finally, since the quality of the second receiver is typically lower than that for the primary receiver, the scenarios supported by the Simultaneous-mode will function in the Hybrid-mode during low receiver power conditions so that the IS-2000 paging performance does not suffer.

Simultaneous-Mode Operation

Figure 3:
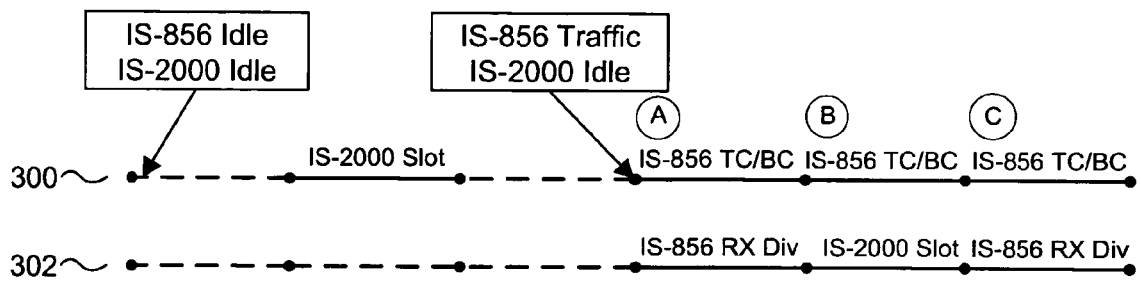
FIG. 3 illustrates a Simultaneous-mode operation and transceiver use.

The following explains the Simultaneous-mode operation, which is invoked during the Hybrid-mode operation when the AT is in an active IS-856 traffic or broadcast connection, while also in an IS-2000 idle slotted paging mode operation. In a slotted paging scheme, pages directed to a particular AT are transmitted only during specified time slots. Referring to FIG. 3, there is illustrated the allocation of a primary transceiver 300 and a secondary receiver 302. More specifically, the dotted lines represent periods where the given transceiver is not in use, while solid lines represent periods where the transceiver is used by the specified technology.

When the IS-856 traffic and IS-2000 idle session begins (denoted as A in FIG. 3), the IS-856 modem uses both the primary transceiver 300 and the secondary receiver 302 of the AT for the purposes of spatial diversity for IS-856 traffic. Before the IS-2000 wake-up slot arrives, the AT disables the secondary receiver 302, effectively disabling the Diversity mode, and then retunes the secondary receiver 302 to the IS-2000 carrier frequency (at B in FIG. 3). The AT then proceeds to perform all IS-2000 pilot set maintenance, overhead message maintenance, page match detection or 1x system acquisition and synchronization attempts while the IS-856 traffic connection remains uninterrupted on the primary transceiver 300. In particular, the secondary receiver 302 is switched from the Diversity mode to the Simultaneous-mode by switching its mixer to be driven by a Voltage Controlled Oscillator (VCO) separate from the VCO of the primary transceiver 300. After the IS-2000 activities are completed for that slot, the secondary receiver 302 is retuned to the IS-856 carrier and spatial receive diversity resumes (at C in FIG. 3). This behavior repeats for each IS-2000 slot wakeup. Since the IS-856 traffic connection is never interrupted, both the throughput and latency on the reverse link and forward link are improved over the Hybrid-mode operation.

For all other non-Simultaneous-modes, the primary transceiver 300 is time shared between IS-2000 and IS-856. Therefore, only one air interface uses the radio at a time.

Hybrid-Mode Operation

Figure 4:
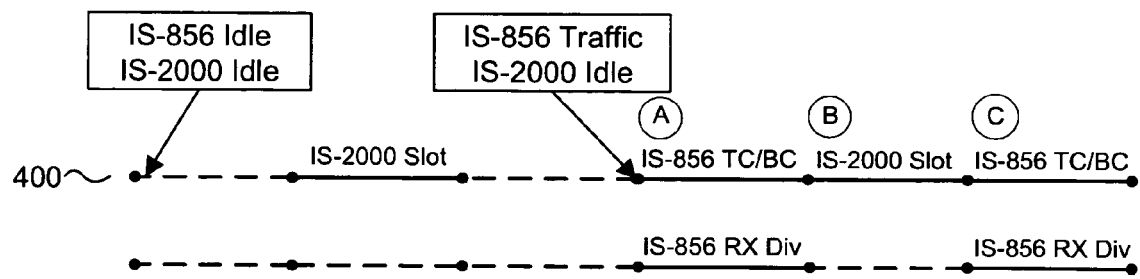
FIG. 4 illustrates a Hybrid-mode operation and transceiver use.

The Hybrid-mode contrasts with the Simultaneous-mode. That is, in the Hybrid-mode, a primary transceiver 400 as illustrated in FIG. 4 is time shared during all IS-2000 and IS-856 mode combinations. At B in FIG. 4, the transceiver 400 is used by IS-2000 during a slot wakeup and IS-856 is preempted. When the AT is not in IS-856 traffic or broadcast, or is not in IS-2000 slotted paging, there is no change to the system design since the Simultaneous-mode is never engaged.

Simultaneous Operation on Asymmetric Receivers

On most deployable handsets, market demands on size and convenience necessitate keeping the antenna for the secondary receiver hidden, i.e., the antenna 205 as shown in FIG. 2. To satisfy this requirement, the secondary antenna tends to-be of suboptimal design for the target operating band and is often internal to the AT. As a result, the lower total antenna gain will reduce the $E_c/I_o$ and $E_b/N_t$ when the received power ($I_o$) approaches the sensitivity level of the secondary receiver. In addition, shadow fading caused by the AT's electronics might reduce the $E_c/I_t$ and $E_b/N_t$ as the signal energy decreases. Thus, for IS-2000 paging operation to be as reliable as the paging operation that is found in the existing Hybrid-mode design, the Simultaneous-mode must be disabled during low signal-to-interference-and-noise ratio (SINR) conditions.

Figure 5:
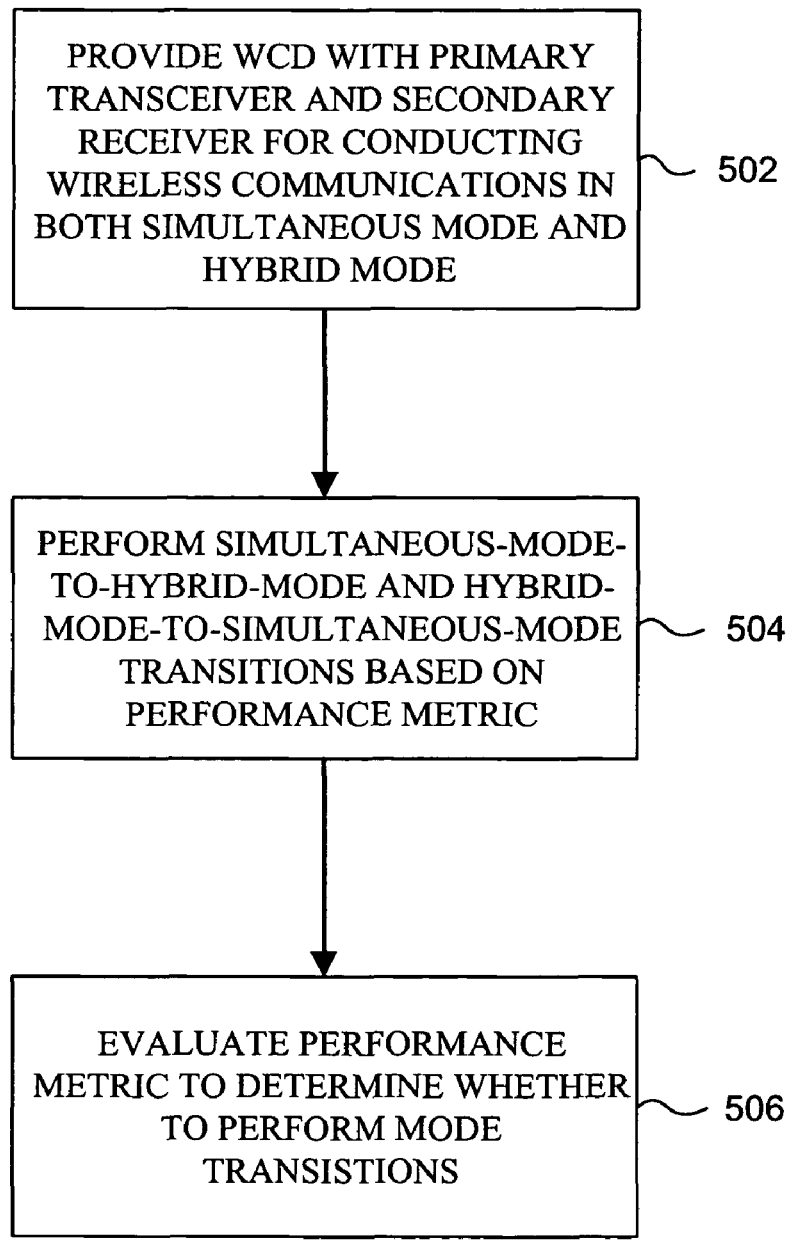
FIG. 5 is a flowchart illustrating the operations of the invention.

To address the issue of asymmetric receivers, the Simultaneous-mode is designed to perform Simultaneous-mode-to-Hybrid-mode and Hybrid-mode-to-Simultaneous-mode transitions. Referring to FIG. 5, there is shown a flowchart illustrating the operations of the invention. At step 502, a WCD is provided with a primary transceiver and a secondary receiver for conducting wireless communications in both a simultaneous-mode and a hybrid-mode. At step 504, the Simultaneous-mode-to-Hybrid-mode or the Hybrid-mode-to-Simultaneous-mode transition is performed based on a performance metric, and at step 506, the performance metric is evaluated to determine whether to perform the mode transitions. In the Simultaneous-mode, the primary transceiver conducts wireless communications in the second network, and the secondary receiver conducts wireless communications in the first network. In the Hybrid-mode, the primary transceiver use is time multiplexed during all of the first and second networks communications combinations. The performance metric is the total received power ($I_o$) detected on the receiver, wherein the evaluation is done periodically. It is appreciated that the WCD reverts to the Hybrid-mode when the performance metric measures below a Simultaneous-to-Hybrid threshold, and that the WCD reverts at paging slot wake-ups. Similarly, the WCD reverts to the Simultaneous-mode when the performance metric measures above a Hybrid-to-Simultaneous threshold. To prevent the ping-pong effect, hysteresis is maintained by setting the Hybrid-to-Simultaneous threshold to be higher than the Simultaneous-to-Hybrid threshold and, in particular, the ping-pong effect may be prevented by setting the difference between the two thresholds to be greater than the difference between the primary antenna gain and the secondary antenna gain.

During simultaneous operation, the IS-2000 modem may wish to perform access attempts using the primary receiver. The urgency with which the IS-856 modem will release the primary receiver to the IS-2000 modem is dictated by the reason for the IS-2000 access attempt. More specifically, incoming calls that do not contain the SMS service option and all outgoing calls are considered urgent. The IS-856 access attempts, broadcast connections, and traffic connections will be interrupted immediately without performing DRC ramp down. If the access attempt is for an L2 ACK, registration or SMS incoming call, then the IS-856 modem will not release the primary receiver during the access state, and will allow DRC ramp down to finish before releasing the primary receiver during the broadcast and traffic states. If the IS-856 traffic connection is used for session negotiation, then the modem will wait for the session negotiation to complete before releasing the primary receiver regardless of the reason for the IS-2000 access attempt.

High Priority Traffic (HPT) Mode Usage

For some IS-856 carriers, video telephony over IP performance is considered higher priority than IS-2000 paging operation. In this case, the invocation of a video telephony connection using the IVideoPhone or the AMSS QVP API will cause the IS-856 traffic connection to be in HPT mode. This mode is not invoked for other applications.

HPT Operation

Figure 6A:
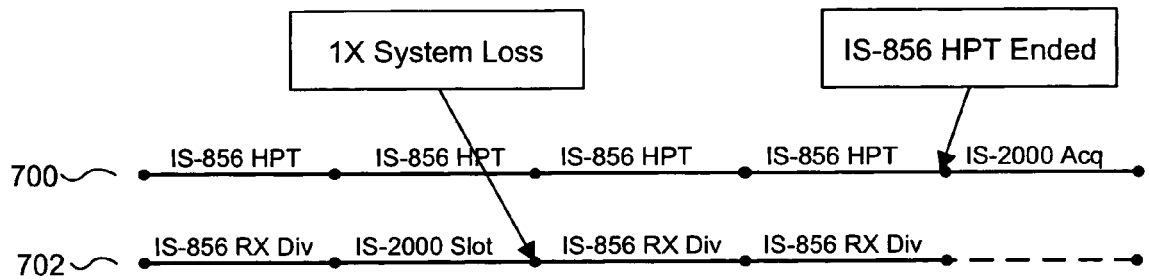
FIG. 6(A) illustrates an HPT Simultaneous-mode operation and receiver use.

In another aspect, the WCD may dynamically invoke Simultaneous-mode to optimize HPT latency/throughput without sacrificing 1x paging performance. Referring to FIG. 6(A), HPT operates similarly to the basic Simultaneous-mode with the following exception. In HPT Simultaneous-mode, the IS-856 traffic rises in priority above IS-2000 paging and IS-2000 acquisition with regard to primary receiver 600.

Therefore, the IS-2000 paging operation is exclusively limited to secondary receiver 602 regardless of signal quality. In the event of an IS-2000 system loss, the IS-2000 modem will not interrupt IS-856 traffic. Instead, acquisition will only continue after the IS-856 modem terminates the HPT connection.

While the IS-2000 slotted mode operation does not interfere with IS-856 HPT, the IS-856 modem will be interrupted for IS-2000 modem access. Examples of this include:
 (1) IS-2000 registrations;
 (2) IS-2000 call originations or page responses; and
 (3) IS-2000 L2 ACK transmissions.

If the IS-2000 access attempts are not desired, then the Data Dedicated Transmission Mode (DDTM) may be used to modify the IS-2000 modem's behavior.

Figure 6B:
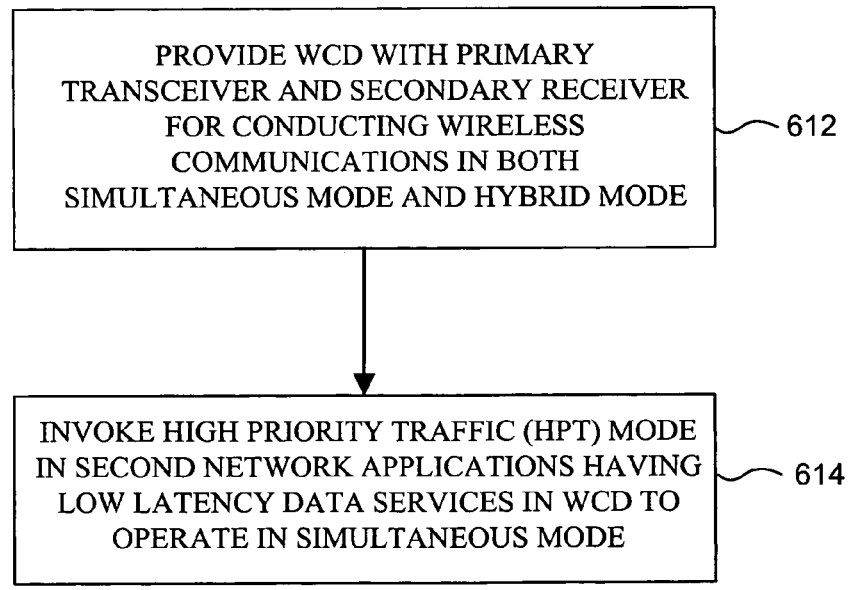
FIG. 6(B) is a flowchart illustrating the HPT Simultaneous-mode operations of FIG. 6(A).

Referring to FIG. 6(B), there is shown a flowchart illustrating the HPT Simultaneous-mode operations. In particular, a process of conducting wireless communications between a WCD and both a first network (e.g., IS-2000) supporting voice and data services and a second network (e.g., IS-856) supporting packet data services is disclosed. With this aspect, the WCD includes a primary transceiver and a secondary receiver for conducting wireless communications in both a Simultaneous-mode and a Hybrid-mode at step 612. At step 614, the process invokes HPT mode in second network applications having low latency data services in the WCD to operate in the Simultaneous-mode. The first network may be an IS-2000 network and the second network may be an IS-856 network. With this process, the WCD may use the secondary receiver for spatial diversity for the second network while no first network activities are performed; it should be noted that this process of the invention does not perform Hybrid-mode-to-Simultaneous-mode transitions based on a performance metric.

Antenna Requirements

There are no specific antenna design requirements imposed by the Simultaneous-mode aside from the requirement that at least two antennas exist as described above and illustrated in FIG. 2. Currently, the IS-98 and IS-856 performance standards and carrier requirements apply to the primary antenna. However, the ATs may differ greatly with respect to the design of the secondary antenna. This will cause varying performance in terms of an AT's ability to remain in the Simultaneous-mode. As such, carriers are encouraged to specify gain requirements on the secondary antenna which are suited to their specific networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of improving wireless communications between a wireless communication device and both a first communication network and a second communication network, the method comprising:
 providing the wireless communication device with a primary transceiver and a secondary receiver that are configured to conduct wireless communications in both a simultaneous-mode and a hybrid-mode, wherein in the simultaneous-mode the wireless communication device is configured to communicate with the second network via both the primary transceiver and the secondary receiver during a first time slot, wherein in the simultaneous-mode the wireless communication device is further configured to communicate with the second network via the primary transceiver and with the first network via the secondary receiver during a second time slot that is different than the first time slot, and wherein in the hybrid-mode the wireless communication device is configured to communicate via the primary transceiver with only one of the first network and the second network at any given time;

performing simultaneous-mode-to-hybrid-mode and hybrid-mode-to-simultaneous-mode transitions based on a performance metric; and evaluating the performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

2. The method of claim 1, wherein in the hybrid-mode, the primary transceiver use is time multiplexed during all of the first and second networks communications combinations.

3. The method of claim 1, wherein the performance metric evaluation is done periodically.

4. The method of claim 1, wherein the wireless communication device reverts to the hybrid-mode when the performance metric measures below the second threshold level.

5. The method of claim 4, wherein the wireless communication device reverts at paging slot wake-ups.

6. The method of claim 1, wherein the wireless communication device reverts to the simultaneous-mode when the performance metric measures above the first threshold level.

7. The method of claim 6, wherein the wireless communication device reverts at paging slot wake-ups.

8. The method of claim 1, wherein the first network is an IS-2000 network and the second network is an IS-856 network.

9. A method of conducting wireless communications between a wireless communication device and both a first communication network and a second communication network, the method comprising:

providing the wireless communication device with a primary transceiver and a secondary receiver that are configured to conduct wireless communications in both a simultaneous-mode and a hybrid-mode, wherein in the simultaneous-mode the wireless communication device is configured to communicate with the second network via both the primary transceiver and the secondary receiver during a first time slot, wherein in the simultaneous-mode the wireless communication device is further configured to communicate with the second network via the primary transceiver and with the first network via the secondary receiver during a second time slot that is different than the first time slot, and wherein in the hybrid-mode the wireless communication device is configured to communicate via the primary transceiver with only one of the first network and the second network at any given time, wherein applications operating with the second network are able to invoke a high priority traffic mode in the wireless communication device invoking the wireless communication device to operate in the simultaneous-mode, evaluating a performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

10. The method of claim 9, wherein the first network is an IS-2000 network and the second network is an IS-856 network.

11. The method of claim 9, wherein the wireless communication device uses the secondary receiver for spatial diversity for the second network while no first network activities are performed.

12. The method of claim 9, wherein the wireless communication device does not perform hybrid-mode-to-simultaneous-mode transitions based on a performance metric.

13. An apparatus for improving wireless communications with both a first communication network and a second communication network, the apparatus comprising:

means for conducting wireless communications in both a simultaneous-mode and a hybrid-mode, the means for conducting comprising a first means and a second means, wherein in the simultaneous-mode the means for conducting wireless communications is configured to communicate with the second network via both the first means and the second means during a first time slot, wherein in the simultaneous-mode the means for conducting wireless communications is further configured to communicate with the second network via the first means and with the first network via the second means during a second time slot that is different than the first time slot, and wherein in the hybrid-mode the means for conducting wireless communications is configured to communicate via the first means with only one of the first network and the second network at any given time;

means for performing simultaneous-mode-to-hybrid-mode and hybrid-mode-to-simultaneous-mode transitions based on a performance metric; and means for evaluating the performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

14. The apparatus of claim 13, wherein the first means comprises a primary transceiver and the second means comprises a secondary receiver.

15. The apparatus of claim 13, wherein in the hybrid-mode, the first means use is time multiplexed during all of the first and second networks communications combinations.

16. The apparatus of claim 13, wherein the evaluating means periodically evaluates the performance metric.

17. The apparatus of claim 13, wherein the performing means reverts to the hybrid-mode when the performance metric measures below the second threshold level.

18. The apparatus of claim 17, wherein the performing means reverts at paging slot wake-ups.

19. The apparatus of claim 13, wherein the performing means reverts to the simultaneous-mode when the performance metric measures above the first threshold level.

20. The apparatus of claim 19, wherein the performing means reverts at paging slot wake-ups.

21. The apparatus of claim 13, wherein the first network is an IS-2000 network and the second network is an IS-856 network.

22. An apparatus for conducting wireless communications with both a first communication network and a second communication network, the apparatus comprising:

a primary transceiver and a secondary receiver for conducting wireless communications in both a simultaneous-mode and a hybrid-mode, wherein in the simultaneous-mode the primary transceiver and the secondary receiver are configured to communicate with the second network during a first time slot, wherein in the simultaneous-mode the primary transceiver is configured to communicate with the second network and the secondary receiver is configured to communicate with the first network during a second time slot that is different than the first time slot, and wherein in the hybrid-mode the primary transceiver is configured to communicate with only one of the first network and the second network at any given time, wherein applications operating with the second network are able to invoke a high priority traffic mode in the wireless communication device invoking the wireless communication device to operate in the simultaneous-mode, evaluating a performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

23. The apparatus of claim 22, wherein the first network is an IS-2000 network and the second network is an IS-856 network.

24. The apparatus of claim 22, wherein the secondary receiver is used for spatial diversity for the second network while no first network activities are performed.

25. The apparatus of claim 24, wherein the apparatus does not perform hybrid-mode-to-simultaneous-mode transitions based on a performance metric.

26. A non-transitory computer readable media embodying a method of improving wireless communications between a wireless communications device and both a first communication network and a second communication network, the wireless communication device having a primary transceiver and a secondary receiver for conducting wireless communications in both a simultaneous-mode and a hybrid-mode, the method comprising:

performing simultaneous-mode-to-hybrid-mode and hybrid-mode-to-simultaneous-mode transitions, wherein in the simultaneous-mode the wireless communication device is configured to communicate with the second network via both the primary transceiver and the secondary receiver during a first time slot, wherein in the simultaneous-mode the wireless communication device is further configured to communicate with the second network via the primary transceiver and with the first network via the secondary receiver during a second time slot that is different than the first time slot, and wherein in the hybrid-mode the wireless communication device is configured to communicate via the primary transceiver with only one of the first network and the second network at any given time; and evaluating a performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

27. A non-transitory computer readable media embodying a method of improving wireless communications between a wireless communication device and both a first communication network and a second communication network, the wireless communication device having a primary transceiver and a secondary receiver for conducting wireless communications in both a simultaneous-mode and a hybrid-mode, the method comprising:

invoking a high priority traffic mode in second network applications operating on the wireless communication device invoking the wireless communication device to operate in the simultaneous-mode, wherein in the simultaneous-mode the wireless communication device is configured to communicate with the second network via both the primary transceiver and the secondary receiver during a first time slot, wherein in the simultaneous-mode the wireless communication device is further configured to communicate with the second network via the primary transceiver and with the first network via the secondary receiver during a second time slot that is different than the first time slot, and wherein in the hybrid-mode the wireless communication device is configured to communicate via the primary transceiver with only one of the first network and the second network at any given time, evaluating a performance metric to determine whether to perform the mode transitions, wherein a first performance metric comprises a first threshold level at which the hybrid-mode-to-simultaneous-mode transition is performed, wherein a second performance metric comprises a second threshold level at which the simultaneous-mode-to-hybrid-mode transition is performed, and wherein the first threshold level is different than the second threshold level, wherein the performance metric is a total received power ($I_o$) detected on the secondary receiver, and wherein a ping-pong effect is prevented by setting the difference between the first threshold level and the second threshold level to be greater than the difference between a primary antenna gain of the primary transceiver and a secondary antenna gain of the secondary receiver.

* * * * *